(No Model.)
F. J. MILLER.
INDEX CENTER.
No. 420,278. Patented Jan. 28, 1890.
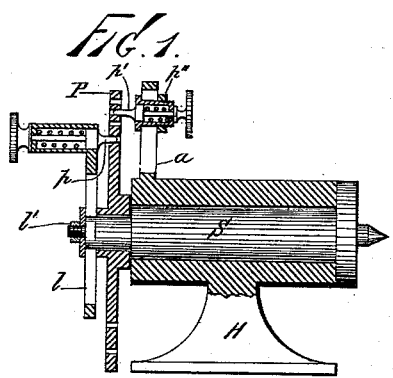
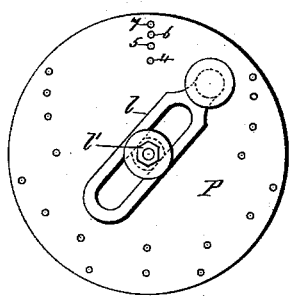
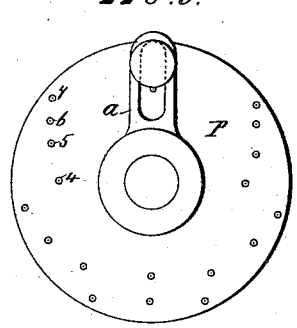
Witnesses:
John Buckles,
L. H. Osgood,
Inventor:
Fred J. Miller,
By Worth Osgood
Attorney.

UNITED STATES PATENT OFFICE.

FRED J. MILLER, OF PLAINFIELD, ASSIGNOR OF ONE-HALF TO FRANK F. HEMENWAY, OF JERSEY CITY, NEW JERSEY.

INDEX-CENTER.

SPECIFICATION forming part of Letters Patent No. 420,278, dated January 28, 1890.

Application filed November 1, 1889. Serial No. 328,935. (No model.)

*To all whom it may concern:*

Be it known that I, FRED J. MILLER, of Plainfield, county of Union, and State of New Jersey, have invented certain new and useful Improvements in Index-Centers, of which the following is a full, clear, and exact description, reference being had to the accompanying drawings, and to the letters of reference marked thereon.

My invention has relation to that class of implements or appliances commonly known among machinists as "index-centers" and employed in connection with planing-machines, shapers, milling and drilling machines to facilitate and measure the revolution of the work through a definite and accurate portion of an arc or a circle. In its usual form, as heretofore employed, the appliance may be described as consisting essentially of a base adapted to be secured upon the table of the machine upon which it is to be used, this base having at one end a head carrying an index-plate and pin by which the spindle or shaft which passes through the head is rotated through a definite portion or fraction of a circle and (by the pin) retained in the position to which adjusted. At the end of the spindle opposite the index-plate is a center which supports one end of the work to be operated upon, while the other end is sustained by another center usually mounted in a movable head or "foot stock" arranged to be clamped at any desired point on the bed, according to the length of the piece of work. A number of holes are drilled in the index-plate, arranged in circles, of which no two contain the same number of holes. By withdrawing the index-pin from one hole of the plate, turning the plate, and inserting the pin in another hole in the same circle as the first, the plate (and the work) will be turned a fraction of a revolution, its exact measure depending upon the number of holes in the circle and the number of those holes passed over by the pin. For instance, if there be in the circle sixty equally-spaced holes and the pin be removed from one, and the plate turned and the pin caused to enter the next succeeding hole, then the plate (and the work) will be turned just the sixtieth part of a circle; or if one hole of the circle be passed over and the pin made to enter the second, then the thirtieth part of a revolution will be effected, and so on. The pin is so mounted that after withdrawal it will return to exactly the same position as before occupied by it, so that any hole of the index-plate may be brought to the proper position.

It is obvious that with such a device no smaller fraction of a revolution of the index-plate can be made than is equal to the fraction of a complete circle measured by the distance between two holes in the circle having the greatest number of holes; or, in other words, if an index-plate have sixty holes in its circle of greatest number of holes, then one-sixtieth of a revolution is the smallest fraction of a turn which can be definitely given to or be indicated by the plate, and sixty would be the greatest number of teeth (for example) which could be cut in a gear or other piece of work placed upon the centers.

Now, the object of my present invention is to provide an index center or index appliance of this general class which will afford a greatly-increased range of divisions or fractional movements, and this with index-circles having fewer holes than the number of divisions or fractions of movements obtainable by their use, to accomplish all of which and to secure other advantages in the matters of construction, operation, and use my improvements involve the application in connection with the index plate or surface (of whatever character it may be) of two or more adjustable pins or stops, and certain other arrangements or combinations of parts, all of which will be herein first fully described, and then pointed out in the claims.

In the accompanying drawings, forming part of this specification, I have shown at Figure 1 a vertical view, partly in elevation and partly in section, of a machine-head having an index-center applied in accordance with my invention and in one of its simplest forms. Figs. 2 and 3 are views in elevation from opposite sides, showing the index-plate of Fig. 1.

In all the figures like letters of reference wherever they occur indicate corresponding parts.

In the old construction above referred to the index-plate is keyed or otherwise rigidly fixed to or positively connected with the spindle which carries the center upon which the work rests, so that the plate, the spindle, and the work must revolve together.

In the construction shown in the drawings the index-plate P is mounted on the spindle so that it can be freely turned when desired without turning the spindle or the work. S represents the spindle, and H the base of the head, which may be of any form. Upon the head is a fixed arm $a$, having a slot adapted to receive a suitable thimble, in which is an index-pin $p'$. The thimble is movable in the slot, so as to carry the index-pin opposite any desired circle of holes in the plate, and it can be clamped, as by the nut $p''$, at any point to which adjusted. The pin will be forced into the holes of the plate by the action of a suitable spring in the usual manner, and can be drawn out at will, leaving the plate free to be turned upon its axis. Upon the opposite side of the plate is shown a second index-pin $p$, which is mounted at the end of a slotted lever $l$, which lever is so attached to the spindle that the pin $p$ can be brought to enter the holes of any circle in the plate, and can be clamped at the desired distance from the center by means of a nut, as $l'$. When this nut is tightened, the lever $l$ forms a crank, by means of which the spindle can be turned about its axis, the pin being capable of withdrawal from the plate, the same as explained in reference to pin $p'$. It will be observed that with this construction either index-pin can be adjusted so as to engage with the holes of any circle in the plate, and that if pin $p'$ only be withdrawn from the plate the plate may be turned upon its axis, carrying the index-pin $p$, the lever $l$, and the spindle S with it, and also that by leaving the index-pin $p'$ in engagement with the plate the index-pin $p$ can be withdrawn, and then the lever $l$ and spindle S can be turned without disturbing the plate. So it will be plain that either pin can be withdrawn, and while it is held back out of engagement with the plate the spindle can be revolved a definite fraction of a revolution and the pin again inserted. Then the other pin can be drawn back out of engagement with the plate and the spindle turned a definite fraction of a revolution in the same or in the opposite direction, the result of these two motions of the spindle being a fraction of a revolution equal to the difference between the two fractional movements or equal to their sum, according to whether the two movements have been in the same or in opposite directions. For instance, taking the case of a plate, as shown in the drawings, having four circles with four, five, six, and seven holes, respectively, and supposing the index-pin $p$ to be in a hole of the outer circle, or the one having seven holes, and the index-pin $p'$ to be in a hole of the circle having six holes, then by withdrawing pin $p$ the spindle can be turned from one hole to the next one, or one-seventh of a revolution. After this pin $p$ can be withdrawn in the same manner, and the plate, pin $p'$, lever $l$, and spindle S turned together one-sixth of a revolution, the result of the two motions being a movement of the spindle through a fraction of a revolution equal to the difference between one-seventh and one-sixth, which is one forty-second of a revolution. In like manner if the plate contain circles, one having thirty-six and another forty holes, then the spindle could be given a movement equal to the difference between one thirty-sixth and one-fortieth, which is one three hundred and sixtieth, or one degree of arc.

Examples sufficient have been given to show that a vast number of divisions or fractional movements may be obtained by combining the adjustments made possible by the two movable pins.

While the machine shown is in one of its simplest forms, it is not intended that the invention shall be limited to that form. Various modified forms, all, however, embodying the same principles, will readily suggest themselves. For example, the plate with holes in it may be replaced by any surface divided in like manner and capable of being engaged by pins or pointers of any form, whether made to enter holes or simply to enter recesses between teeth or equivalently-spaced projections, and so on. So also the position of the plate or index-surface, its connection with the spindle, and the location of the pins or pointers may be varied without in any way departing from the principle of the invention.

While two pins or equivalent pointers are necessary, a greater number may possibly be used.

The device constructed and arranged for operation upon the principles above explained will be found to admirably answer the general purpose or object of the invention, and to afford a simple, cheap, and effective index-center, easy to make and convenient to operate, obviating the expense of cutting large index-surfaces with vast numbers of holes, as heretofore necessary.

Having now fully described my invention, what I claim as new herein, and desire to secure by Letters Patent, is—

1. In a device of the character herein set forth, the combination, with a spindle or shaft, of an index-surface loosely mounted with respect to the shaft, and two or more adjustable pins or pointers adapted to engage with said index and to regulate the extent of movement of the shaft, substantially as and for the purposes explained.

2. In a device of the character herein set forth, the combination, with a spindle or shaft, of an index-surface loosely mounted in respect thereto, a pin or pointer for holding the index, and another pin or pointer connected with the spindle or shaft, both pins being adjustable, substantially as and for the purposes explained.

In testimony that I claim the foregoing I have hereunto set my hand in the presence of two witnesses.

FRED J. MILLER.

Witnesses:
 JOHN BUCKLER,
 WORTH OSGOOD.